Figure 1:
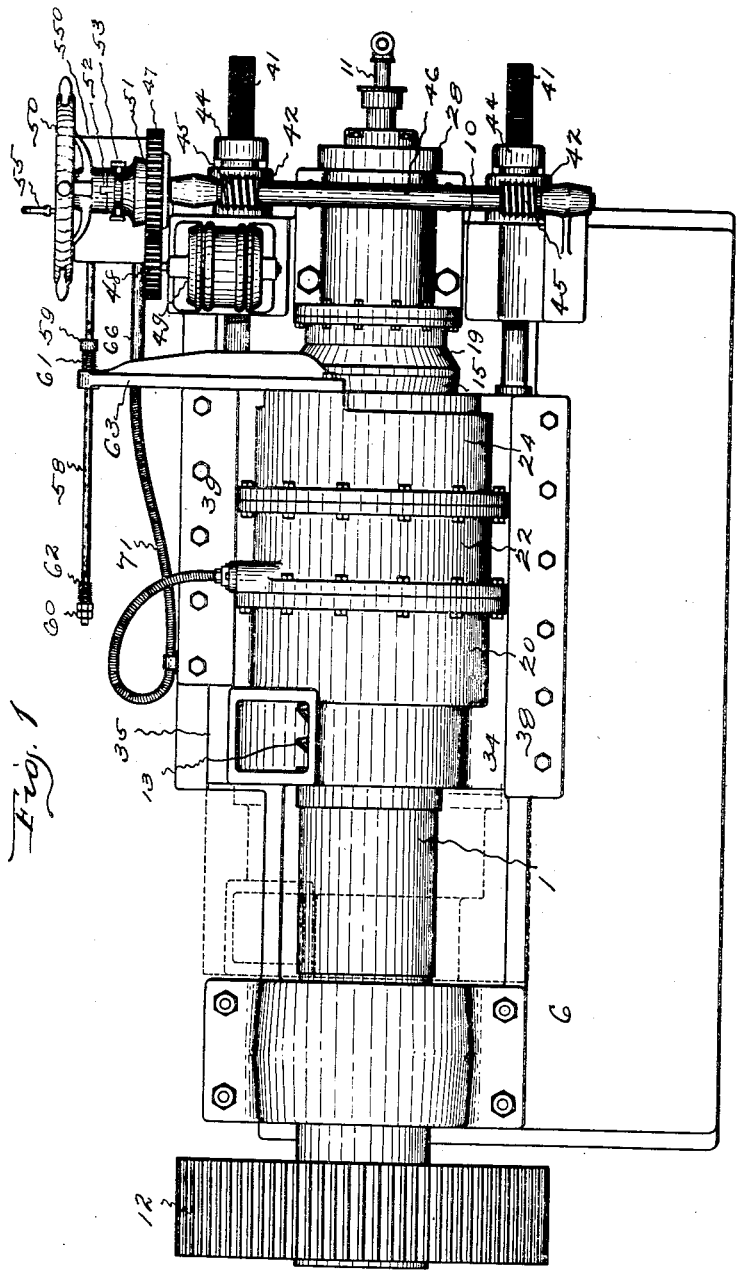

W. A. GORDON.
MACHINE FOR REFINING RUBBER.
APPLICATION FILED MAY 17, 1921.

1,403,681.

Patented Jan. 17, 1922.
5 SHEETS—SHEET 1.

INVENTOR
William A. Gordon,
Harry R. Williams
ATTORNEY

W. A. GORDON.
MACHINE FOR REFINING RUBBER.
APPLICATION FILED MAY 17, 1921.
1,403,681.
Patented Jan. 17, 1922.
5 SHEETS—SHEET 2.
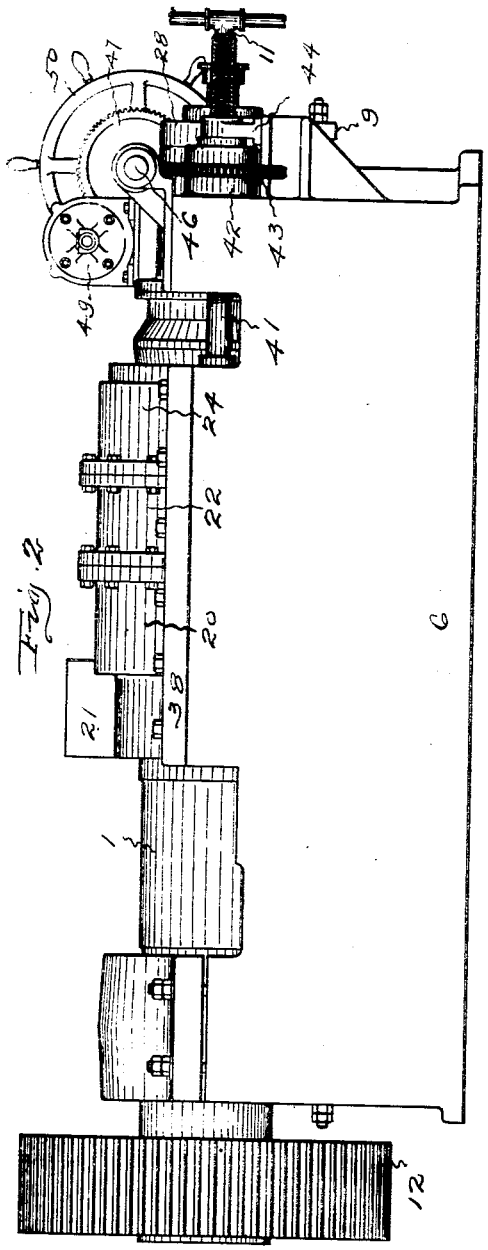
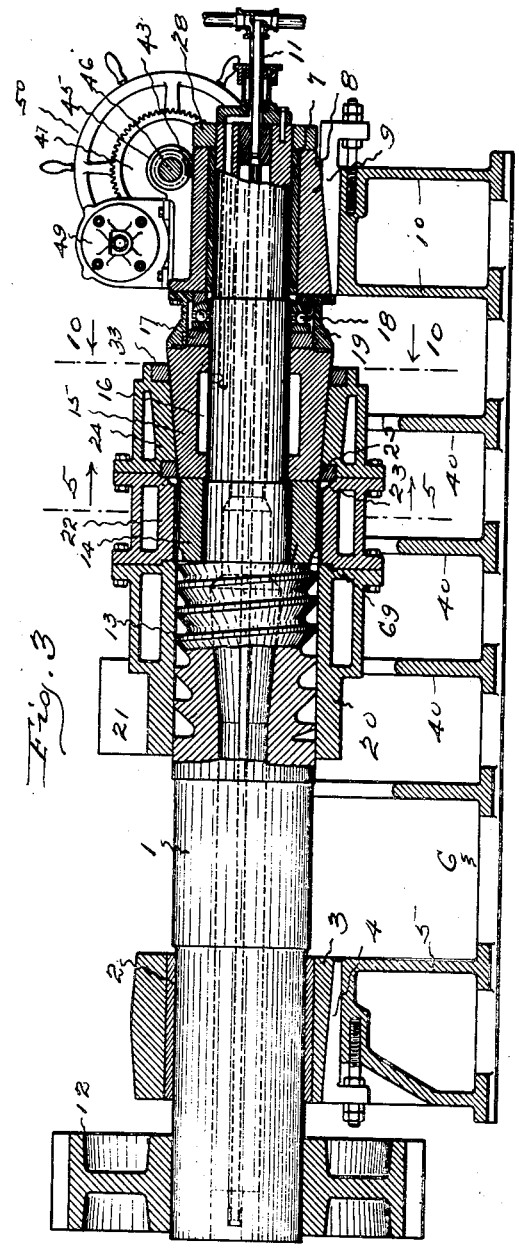
INVENTOR
William A. Gordon by
Harry P. Williams
ATTORNEY.

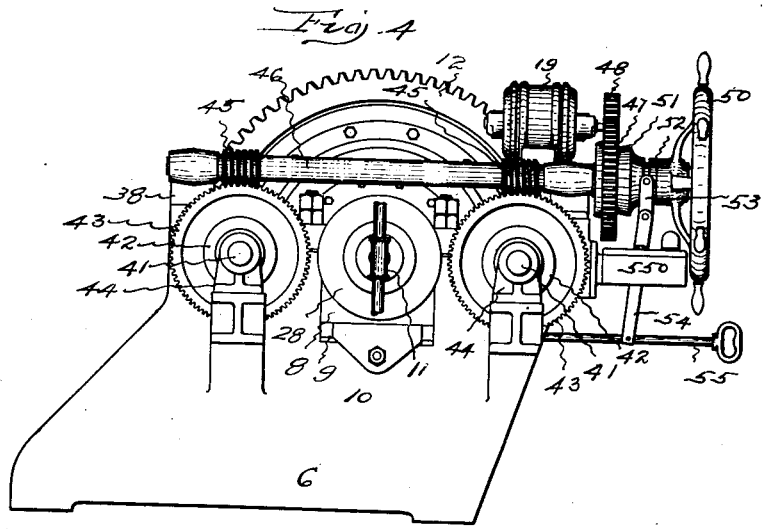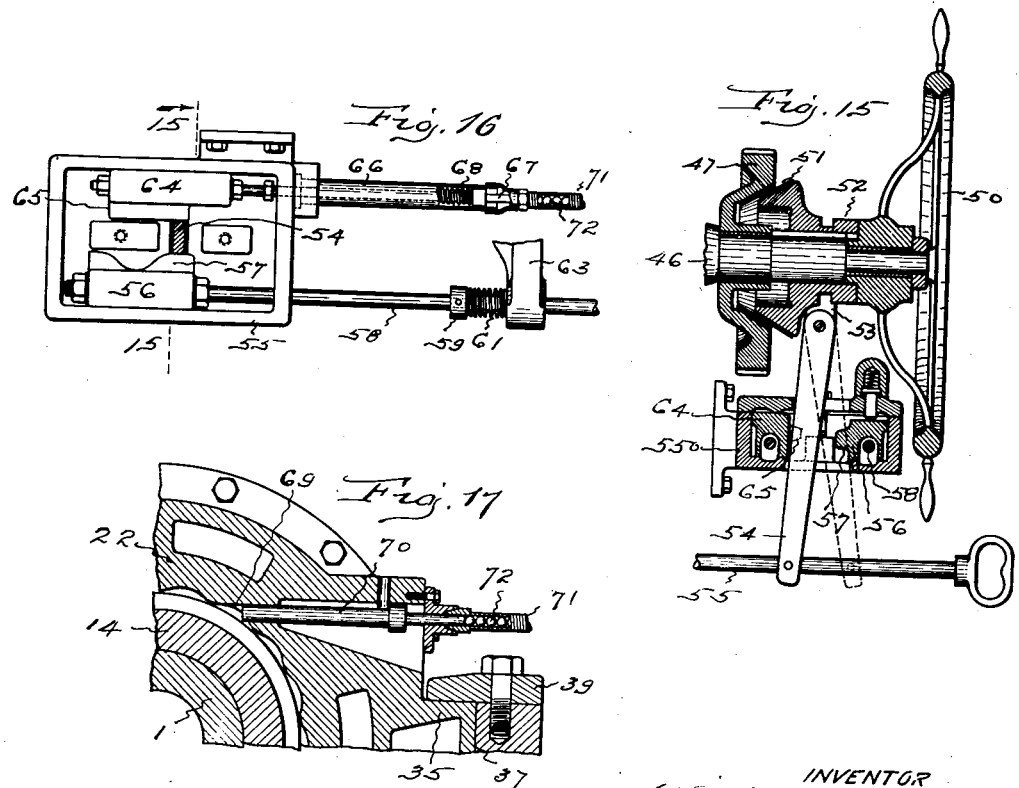

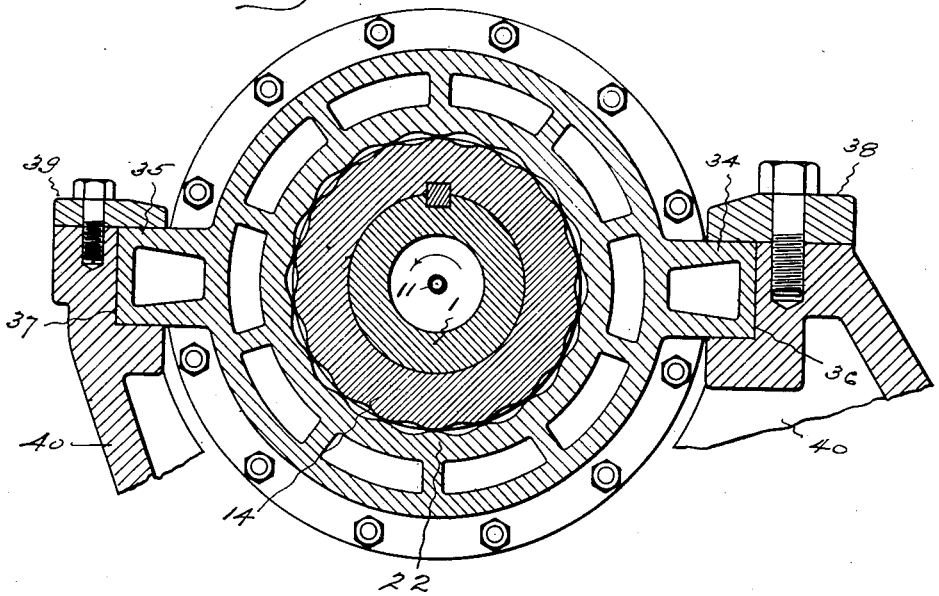
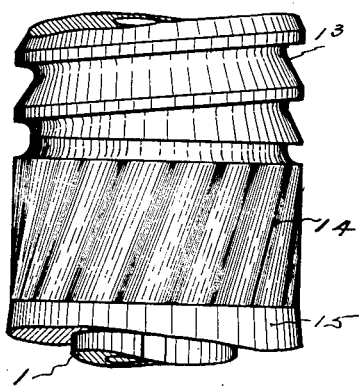
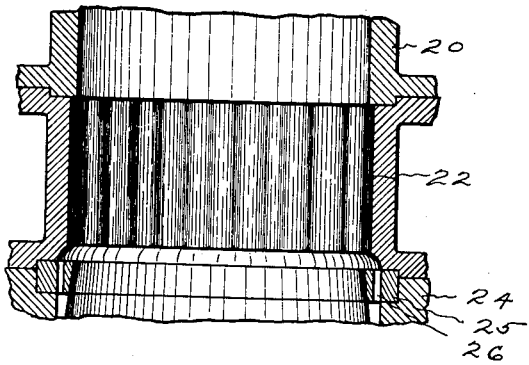
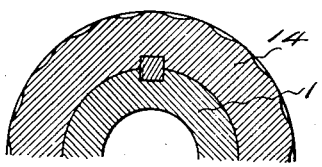

W. A. GORDON.
MACHINE FOR REFINING RUBBER.
APPLICATION FILED MAY 17, 1921.
1,403,681.
Patented Jan. 17, 1922.
5 SHEETS—SHEET 5.
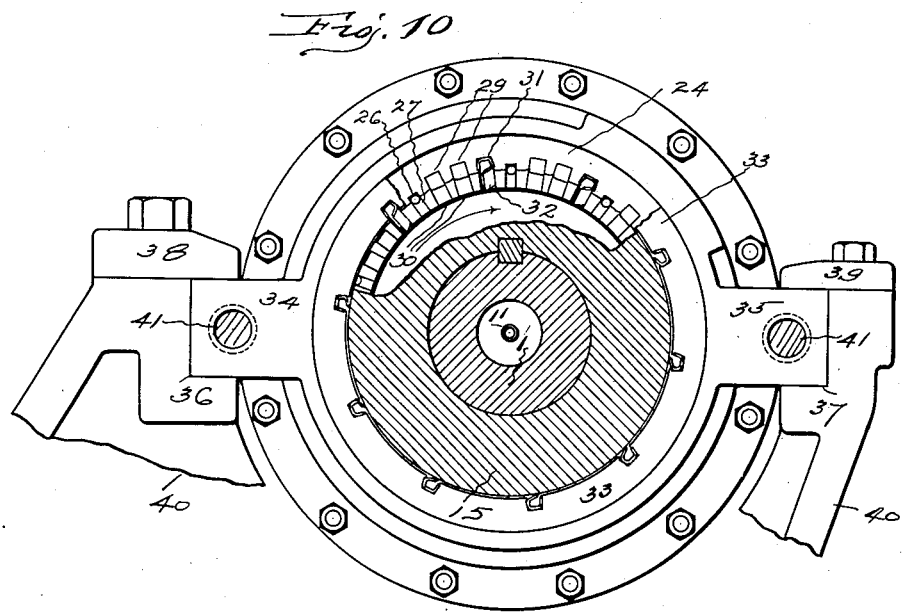
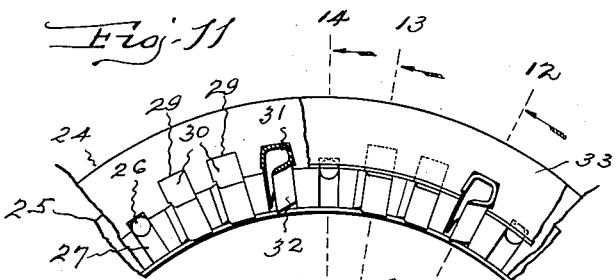
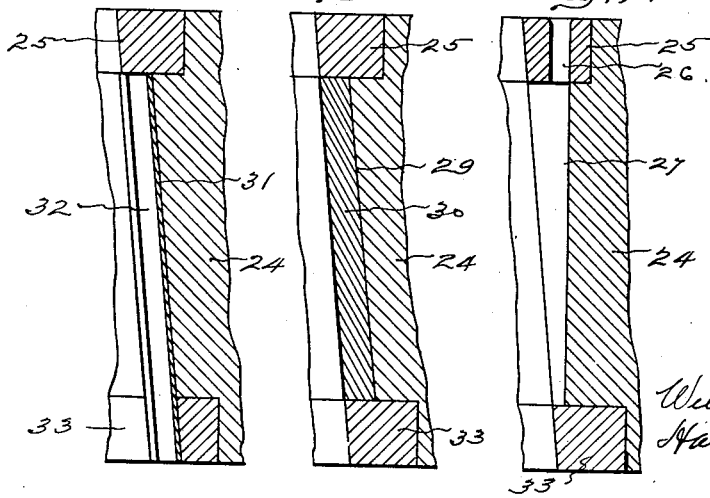
INVENTOR
William A. Gordon
Harry R. Williams
ATTORNEY.

UNITED STATES PATENT OFFICE.

WILLIAM A. GORDON, OF SHELTON, CONNECTICUT, ASSIGNOR TO BIRMINGHAM IRON FOUNDRY, OF DERBY, CONNECTICUT.

MACHINE FOR REFINING RUBBER.

1,403,681.   Specification of Letters Patent.   Patented Jan. 17, 1922.

Application filed May 17, 1921. Serial No. 470,431.

*To all whom it may concern:*

Be it known that I, WILLIAM A. GORDON, a citizen of the United States, residing at Shelton, in the county of Fairfield and State of Connecticut, have invented a new and useful Improvement in Machines for Refining Rubber, of which the following is a specification.

This invention relates to a machine which is designed for refining rubber, that is for breaking up all lumps and foreign matter in and masticating the stock which is fed to it and discharging the product in a smooth plastic state.

The object of the invention is to provide a machine for accomplishing this result which while relatively cheap to build, comparatively small in size and very easy to operate, will refine a large quantity of rubber stock in a short time with a minimum expenditure of power, and discharge the stock in a desirable condition and having a uniform density.

This object is attained in the machine illustrated by forcing the stock from a hopper by a rotatory feed screw into a stationary external massing die where it is ground and masticated by the co-operation of a rotating internal massing die with the wall of the external massing die, and then forcing the stock thus treated into a stationary external refining die where it is still further reduced under great pressure by the action of a rotatory internal refining die which co-operates with the wall of the external refining die for completing the reduction and mastication of the stock. In this machine the hopper, feed screw casing, external massing die and external refining die are connected and mounted so they may be moved longitudinally with relation to the feed screw, the internal massing die and internal refining die to permit the parts to be easily cleaned when necessary and accurately adjusted for producing the best results on the stock, and this movement of these parts is so controlled that the dies cannot be damaged by inaccurate adjustment or careless handling.

In the accompanying drawings, Figure 1 shows a plan of a machine which embodies the invention. Fig. 2 is a side elevation of the machine. Fig. 3 shows a vertical longitudinal section of the machine. Fig. 4 is an elevation looking toward the discharge end of the machine. Fig. 5 is a transverse section on larger scale taken through the massing dies of the machine on the plane indicated by the dotted line 5—5 on Fig. 3. Fig. 6 is a plan of a portion of the feed screw and the internal massing die. Fig. 7 shows a transverse section of a portion of the internal massing die. Fig. 8 is a longitudinal section looking into the external massing die. Fig. 9 is a transverse section of a portion of the external massing die. Fig. 10 is a transverse section taken through the refining dies on the plane indicated by the dotted line 10—10 on Fig. 3 with a portion of the internal refining die cut away. Fig. 11 is a face view of a portion of the external refining die. Fig. 12 is a section on the plane indicated by the dotted line 12—12 on Fig. 11. Fig. 13 is a section on the plane indicated by the dotted line 13—13 on Fig. 11. Fig. 14 is a section on the plane indicated by the dotted line 14—14 on Fig. 11. Fig. 15 is a sectional view of the means for controlling the clutch that connects the operating means with the mechanism provided for moving the external massing and refining dies back and forth. Fig. 16 is a detail view of a portion of the mechanism for locking and releasing the clutch control. Fig. 17 is a sectional view showing a part of the means for actuating the clutch control.

The machine illustrated has a shaft 1 that near one end turns in a bushing 2 in a pillow block 3 adjustably supported by a wedge 4 in a bearing bracket 5 at one end of the base 6. At the other end the shaft turns in a bushing 7 in a pillow block 8 adjustably supported by a wedge 9 in a bearing bracket 10 at the other end of the base (Fig. 3). The shaft which is hollow and is provided with suitable pipe connections 11 which permit a circulation of the water through the interior for keeping down its temperature when in operation, has a gear wheel 12 by means of which it may be rotated.

Near the middle of its length the shaft has a feed screw 13 the groove of which decreases in cross sectional area toward the forward end. Fastened on the shaft so as to rotate therewith in front of the feed screw is the internal massing die 14. The peripheral surface of the internal massing die is corrugated or fluted as shown in Fig. 7 and the grooves of the fluting which are shallow and extend the length of the die are desirably, although not necessarily, run spiral as shown in Fig. 6. Fastened on the shaft so as to rotate therewith in front of the internal massing die is the internal refining die 15. The internal refining die is conical with its larger end forward, and its peripheral surface is preferably smooth. The internal refining die has a chamber 16 that communicates with the opening in the shaft so that cooling water will circulate therein. In front of the refining die is a collar 17 and between this collar and the bracket 10, is an anti-friction thrust bearing 18 which takes the thrust of the parts in one direction. Encircling this bearing is a dust casing 19. On the end of the shaft outside of the bracket 10 is a collar 28 which holds the shaft from movement in the opposite direction (Fig. 3).

Encircling the feed screw is a casing 20 which on top at one side has a feed hopper 21 into which the material to be acted on by the machine is placed. The feed screw casing is chambered for the circulation of cooling water. In front of the feed screw casing and fastened thereto around the internal massing die is the external massing die 22. The external massing die is chambered for the circulation of cooling water. The interior surface of the external massing die is fluted preferably with the grooves extending its entire length parallel with its axis as shown in Figs. 8 and 9. The interior diameter of the external massing die is but slightly larger than the exterior diameter of the internal massing die so that as the latter die is rotated and material is forced between the massing dies by the feed screw the material will be crushed very fine and masticated thoroughly by the travel of the high points of the flutes of the internal die past the high points of the flutes of the external die. Surrounding the internal refining die and fastened to the external massing die is the external refining die 24 which is chambered for water cooling. The interior wall of the external refining die tapers and is of such size that when in operative adjustment, it conforms closely to the surface of the internal refining die.

Between the external massing and refining dies is a ring 25, (Fig. 3) and through this ring are a large number of ports 26 which join the annular space 23 at the forward end of the massing dies with grooves 27 in the interior wall of the exterior die. These intake grooves 27 decrease in size from the ports, as shown in Fig. 14. In front, rotarily, of each of the grooves 27 in the interior of the external refining die are grooves 29 in which are placed hard metal crushing strips 30, the surfaces of which fit quite close to the surface of the internal refining die. In front, rotarily, of the grooves 29 in the interior of the external refining die are grooves 31 containing spring scrapers 32 the edges of which bear against the surface of the internal refining die (Figs. 10 and 11). As the material is forced forward after having been crushed and masticated by the massing dies, it enters and fills the grooves 27 and is carried by the internal refining die past the crushing strips 30 which lie close to the surface of the internal refining die so that the material will be subjected to great pressure and then be collected by the scrapers. The scrapers open through the ring 33 in the end of the external refining die for the out-flow of the material which has been acted upon by the refining dies and scraped therefrom by the scrapers.

The feed screw casing, the external massing die and the external refining die when bolted together form a unit which on one side has a guide wing 34, and on the other side a guide wing 35. These wings are supported in ways 36 and 37, being held in place by cap plates 38 and 39 on the brackets 40 which are secured to the base and form part of the frame (Fig. 3). Screws 41 that extend parallel with the shaft on each side are secured to the wings 34 and 35 at the front end of the exterior refining die. These screws pass through the threaded hubs 42 of worm wheels 43 and are supported at their outer ends by brackets 44. These worm wheels are engaged by worms 45 on a shaft 46 that extends transversely across the front end of the machine and is supported on top of the bracket 10 (Figs. 1 and 4). Near one end and loosely mounted on the shaft 46 is a gear 47. Meshing with this gear is a pinion 48 on the armature shaft of a motor 49 that is mounted on the machine. A hand wheel 50 is also loosely mounted on the shaft 46. Between the gear 47 and hand wheel 50 and keyed to the shaft 46 is a double clutch having a clutch member 51 that is adapted to engage with the gear and a clutch member 52 that is adapted to engage with the hand wheel. If the clutch is engaged with the gear the motor may be used to turn the shaft 46 through the worms, worm wheels and screws move the external dies longitudinally for uncovering and covering the internal dies. If the clutch member is engaged with the hand wheel the external dies may be moved back and forth by hand.

Engaging a groove in the clutch hub is a fork 53 on the end of the lever 54 that is connected with an operating rod 55. By pulling or pushing this rod the clutch may be engaged so that the external dies may be moved back and forth either by the motor or by the hand wheel (Figs. 4 and 15). The lever 54 extends through a box 550 that is fastened to the side of the frame at the front end. In the box on one side of the lever is a slide 56 with the cam-shaped locking wing 57. A rod 58 projects through the box and on the outside has a collar 59 and a collar 60. On the rod adjacent to the collar 59 is a spring 61 and adjacent to the collar 60 is a spring 62. The end of an arm 63 which projects sidewise from the external refining die travels along the rod 58 between the springs (Figs. 1 and 16). The box on the other side of the lever has a slide 64 with a locking wing 65. Projecting from the slide 64 through the box and into a tube 66 is a plunger 67. Surrounding this plunger and arranged to push the plunger into the box is a spring 68 (Fig. 16).

Extending through the wall of the external massing die into the space 69 at the entrance end of the die is a plunger 70 (Fig. 17). This plunger extends into a flexible tube 71 that is connected with the tube 66. The flexible tube between the plungers is filled with balls 72 (Figs. 1, 16 and 17). After the external dies are back with the internal dies uncovered and the motor feed is started, the external dies are advanced until the arm 63 through the spring 61 and collar 59 pushes the slide 56 and causes the cam 57 to move the lever 54 into neutral position and lock it there. At this time the spring 68 through the plunger 67 holds the slide 64 so that the wing 65 also locks the lever 54 (Fig. 16). After the rubber has been fed in sufficient quantity to build up a pressure in the dies great enough to overcome the force of the spring 68 the slide 64 is moved so as to release the lever and permit it to be moved for connecting the hand wheel with the worm shaft. Then the adjustment of the clearance space between the internal and external refining dies may be made by turning the hand wheel to accomplish the best results, but until there is sufficient rubber between these dies to prevent their being jammed together and damaged, the dies cannot be finally adjusted. This means prevents an unskilled workman from running the dies forward so hard as to injure them when no material is being forced in between them, for the control box is inaccessible to the workman.

The stock to be refined is drawn from the hopper by the feed screw and forced forward under considerable pressure through the straight grooves of the external massing die and is carried around by the spiral grooves of the internal massing die so as to be thoroughly broken down, that is the coarse particles are crushed into a very fine state and the stock thoroughly masticated. The stock is then forced between the refining dies, the rotary member of which acting in conjunction with the crushing strips in the fixed member still further reducing the stock. The entrance grooves in the external massing dies being tapered they are easy to machine, as the bottoms are parallel to the axis of the opening in the die. As the stock pushed through the ports passes between the external and internal refining dies along the whole length of the grooves, a uniform linear velocity for the rubber through these grooves is insured by having the grooves of greater cross sectional area at the entrance than at the discharge end, and by making the grooves smaller at the terminal there will be a minimum amount of rubber to be cleaned out after stopping the machine.

The particles of stock leave the grooves through an orifice the same width from end to end of the grooves. They then pass under one of the crushing strips, which is a little closer to the internal die than is the surface of the main body of the external die, but the distance from the crushing strip to the internal die is desirably the same along its full length, practically only a few thousandths of an inch. Leaving this crushing strip, the particles enter a space a little deeper, or thicker, than the space between the crushing strip and the internal die. Any little particles of rubber not fully crushed are here given a chance to expand again and assume their original shape, with the probability that they will be caught and be more completely crushed or refined between the next crushing strip and the internal die. In other words, putting in two crushing strips between the entrance grooves and the two scraper grooves, practically gives two refining operations to the rubber during one passage through the machine, so that when discharged there will be no lumps or particles which are not crushed and the mass will be thoroughly masticated. The scrapers pick up the refined material and discharge it through the openings in the end of the die in the form of a large number of smooth plastic strings of uniform density. The machine shown is arranged to operate horizontally. The invention may, however, without change in principle be embodied in a machine which will operate vertically. Furthermore if desired the massing dies may be omitted so that only the refining operation is accomplished. The adjustments can be made so that there is tremendous pressure exerted on the material radially of the shaft when it is being forced between the refining dies and as the refining dies have considerable capacity and as there are numerous crushing strips in the exterior refining die, the action is not only complete but the output is large.

The invention claimed is:

1. A machine for refining rubber comprising a rotatory conveyer, a casing surrounding the conveyer, a rotatory internal massing die, a stationary external massing die surrounding the internal massing die, a rotatory internal refining die, a stationary external refining die surrounding the internal refining die, and means for rotating the conveyer and internal dies.

2. A machine for refining rubber comprising a conveyer, a casing surrounding the conveyer, an internal massing die, an external massing die surrounding the internal massing die, an internal refining die, an external refining die surrounding the internal refining die, and means for imparting relative rotation between the internal dies and the external dies.

3. A machine for treating rubber stock comprising a stationary external massing die, a rotatory internal massing die surrounded by the external massing die and cooperating therewith to grind and masticate the stock, a stationary external refining die, and a rotatory internal refining die surrounded by the external refining die and cooperating therewith to further reduce and masticate the stock, the chambers in the external dies having a common axis and the rotatory internal dies being connected in axial alignment.

4. A machine for refining rubber comprising rotatory internal massing die, a stationary external massing die surrounding the internal massing die, a rotatory internal refining die, and a stationary external refining die surrounding the internal refining die, said internal dies being connected in axial alignment and said external dies being fastened together.

5. A machine for refining rubber comprising a rotatory shaft bearing a conveyer, a massing die and a refining die, and a casing surrounding the conveyer and containing a massing die and a refining die surrounding said dies on the shaft.

6. A machine for refining rubber comprising a rotatory shaft bearing a conveyer, a massing die and a refining die, and a normally stationary casing surrounding the conveyer and containing a massing die and a refining die surrounding said dies on the shaft, and means for moving said casing longitudinally of the axis of the shaft.

7. A machine for treating rubber stock comprising a casing containing an external massing die and an internal refining die, and a rotatory bearing a massing die and a refining die said dies being surrounded by and co-operating with the respective external dies for grinding, reducing and masticating the stock fed to the dies.

8. A machine for refining rubber comprising a rotatory shaft bearing a massing die and a refining die, and a normally stationary casing containing a massing die and a refining die surrounding said dies on the shaft, and means for moving said casing longitudinally of the axis of said shaft.

9. A machine for refining rubber comprising a rotatory grooved massing die, a rotatory refining die, a grooved stationary massing die surrounding the rotary massing die and a grooved stationary refining die surrounding the rotary refining die.

10. A machine for refining rubber comprising a rotatory feed screw, a rotatory grooved massing die, a rotatory refining die, a grooved stationary massing die surrounding the rotary massing die and a grooved stationary refining die surrounding the rotary refining die.

11. A machine for refining rubber comprising a rotatory grooved massing die, a rotatory tapering refining die, a grooved stationary massing die surrounding the rotary massing die and a grooved tapering stationary refining die surrounding the rotary refining die.

12. A machine for refining rubber comprising a rotatory massing die with spiral grooves in its surface, a stationary massing die with straight grooves in its surface surrounding the rotatory massing die, a rotatory tapering refining die, a stationary tapering refining die with grooves in its surface surrounding the rotary refining die, and crushing strips located at intervals in said grooves in the stationary die and adapted to co-operate with the tapering surface of the rotary refining die.

13. A machine for refining rubber comprising a rotatory massing die with spiral grooves in its surface, a stationary massing die with straight grooves in its surface surrounding the rotatory massing die, a rotatory tapering refining die with a smooth surface, a stationary tapering refining die with straight grooves in its surface surrounding the rotatory refining die, and crushing strips located at intervals in said grooves in the stationary refining die and adapted to co-operate with the tapering surface of the rotary refining die.

14. A machine for refining rubber comprising a rotatory feed screw, a rotatory massing die with spiral grooves in its surface, a stationary massing die with straight grooves in its surface surrounding the rotatory massing die, a rotatory tapering refining die with a smooth surface, a stationary tapering refining die with straight grooves in its surface surrounding the rotatory refining die, and crushing strips located at intervals in said grooves in the stationary die and adapted to co-operate with the tapering surface of the rotary refining die.

15. A machine for refining rubber comprising a rotary massing die with grooves in its surface, a stationary massing die with grooves in its surface surrounding the rotary massing die, a rotary tapering refining die, a stationary tapering refining die with grooves in its surface surrounding the rotary refining die, and crushing strips and scrapers located in some of said grooves, said crushing strips and scrapers co-operating with the rotary refining die for crushing and removing material fed between the dies.

16. A machine for refining rubber comprising a rotary feed screw, a rotary massing die with grooves in its surface, a stationary massing die with grooves in its surface surrounding the rotary massing die, a rotary tapering refining die, a stationary tapering refining die with grooves in its surface surrounding the rotary refining die, and crushing strips and scrapers located in some of said grooves, said crushing strips and scrapers co-operating with the rotary refining die for crushing and removing material forced between the dies by the feed screw.

17. A machine for refining rubber comprising a rotary feed screw, a rotary massing die with spiral grooves in its surface, a stationary massing die with straight grooves in its surface surrounding the rotary massing die, a rotary tapering refining die with a smooth surface, a stationary tapering refining die with straight grooves in its surface surrounding the rotary refining die, and crushing strips and scrapers located in some of said grooves, said crushing strips and scrapers co-operating with the rotary refining die for crushing and removing material forced between the dies by the feed screw.

18. A machine for refining rubber comprising a rotary shaft bearing a feed screw, a massing die and a refining die, said massing die having grooves extending from end to end and said refining die being tapered and having a smooth exterior surface, a casing containing a massing die having grooves extending from end to end and a refining die having grooves extending from end to end, surrounding said dies on the shaft, and a ported ring arranged in the casing between the stationary massing and refining dies.

19. A machine for refining rubber comprising a rotary shaft bearing a massing die and a refining die, a normally stationary casing containing a massing die and a refining die surrounding said dies on the shaft, mechanism for moving said casing longitudinally of the axis of the shaft, a motor adapted to be connected with said mechanism, a hand wheel adapted to be connected with said mechanism, and means for connecting either the motor or the hand wheel with said mechanism for moving the casing containing the external dies.

20. A machine for refining rubber comprising a rotatory shaft bearing a feed screw, a massing die and a refining die, a normally stationary casing containing a massing die and a refining die surrounding said dies on the shaft, mechanism for moving said casing with the external dies longitudinally of the axis of the shaft, a motor adapted to actuate said mechanism, a hand wheel adapted to actuate said mechanism, a clutch adapted to connect either the motor or the hand wheel with the casing shifting mechanism, means for throwing the clutch, and means adapted to hold the clutch throwing mechanism locked with the clutch in neutral position.

21. A machine for refining rubber comprising a rotatory shaft bearing a feed screw, a massing die and a refining die, a normally stationary casing containing a massing die and a refining die surrounding said dies on the shaft, mechanism for moving said casing with the external dies longitudinally of the axis of the shaft, a motor adapted to actuate said mechanism, a hand wheel adapted to actuate said mechanism, a clutch adapted to connect either the motor or the hand wheel with the casing shifting mechanism, means for throwing the clutch, means adapted to hold the clutch throwing mechanism locked with the clutch in neutral position, and means operated by pressure of the material being forced into the dies to unlock the clutch throwing mechanism.

22. A machine for refining rubber comprising a shaft bearing a feed screw and conical refining die, an external refining die surrounding said refining die, said external die having a conical inner wall conforming to the shaft die with longitudinally extending grooves in said tapering wall, a number of said grooves being designed to receive the stock to be refined, a number of said grooves containing crushing strips and a number of said grooves containing scrapers bearing against the internal die.

23. Means for refining rubber comprising a rotatory tapering internal die and a stationary tapering external die conforming to the internal die, said external die having in its inner wall several series of entrance grooves, grooves containing crushing strips and grooves containing scrapers.

24. Means for refining rubber comprising a rotatory tapering internal die, a tapering external die conforming to the internal die, said external die having in its inner wall several series of entrance grooves, grooves containing crushing strips and grooves containing scrapers, and means for moving the external die longitudinally of the axis of the internal die.

25. Means for refining rubber comprising a rotatory tapering internal die, a tapering external die conforming to the internal die, said external die having in its inner wall several series of entrance grooves, grooves containing crushing strips and grooves containing scrapers, and means for imparting relative longitudinal movement between said internal and external dies.

26. A machine for refining rubber comprising a rotatory shaft bearing a feed screw, a massing die and a refining die connected in axial alignment, and a casing, a massing die and a refining die surrounding said feed screw and dies.

27. A machine for refining rubber comprising a shaft bearing a feed screw and a conical refining die, and an external refining die surrounding said conical refining die, said external die having a conical inner wall conforming to the shaft die with longitudinally extending grooves in said tapering wall, a number of said grooves being designed to receive the stock to be refined and other of said grooves containing scrapers bearing against the internal die.

28. Means for refining rubber comprising a rotatary tapering internal die and a stationary tapering external die conforming to the internal die, said external die having in its inner wall several series of entrance grooves and several grooves containing scrapers bearing against the internal die.

29. A machine for refining rubber comprising a rotatory shaft bearing a feed screw and a conical refining die connected in axial alignment, a casing surrounding the feed screw and an external refining die surrounding and conforming to the conical internal refining die, said external die having in its inner wall a plural number of longitudinally extending grooves.

30. A machine for refining rubber comprising a rotatory tapering internal die, a tapering external die conforming to the internal die, one of said dies having in its walls a series of entrance grooves, grooves containing crushing strips and grooves containing scrapers, and means for imparting relatively longitudinal movement between said internal and external dies.

WILLIAM A. GORDON.